No. 867,516. PATENTED OCT. 1, 1907.
N. T. LAUSE, J. C. COLLETT, M. O. KEPLER & L. GRUBER.
EYELETING MACHINE.
APPLICATION FILED NOV. 26, 1906.
5 SHEETS—SHEET 5.
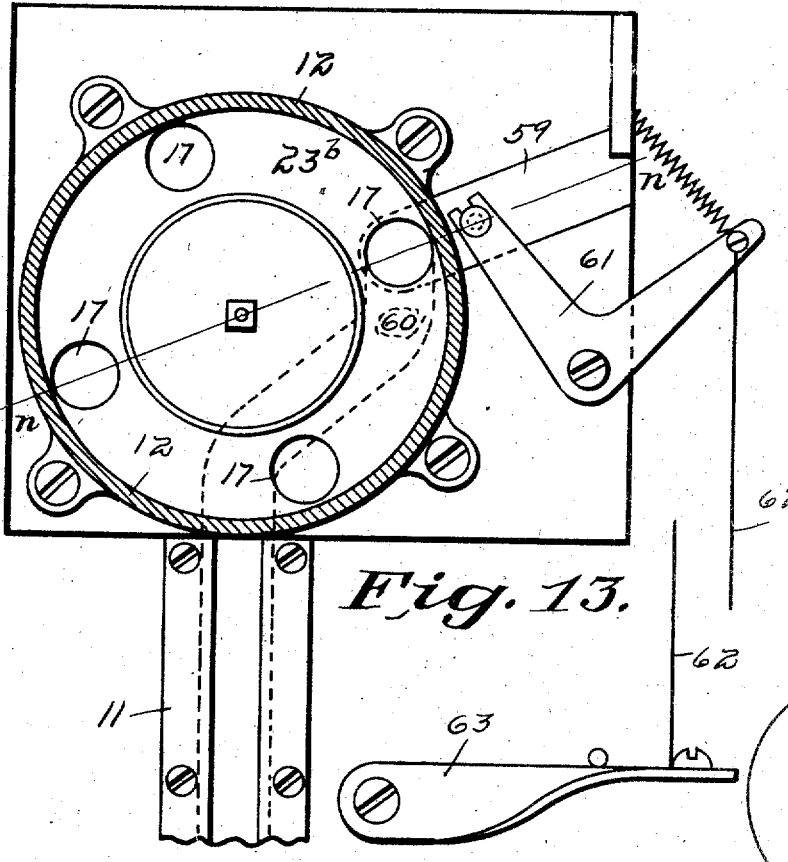
Fig. 13.
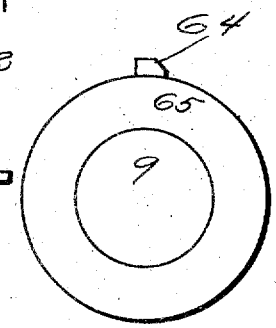
Fig. 10.
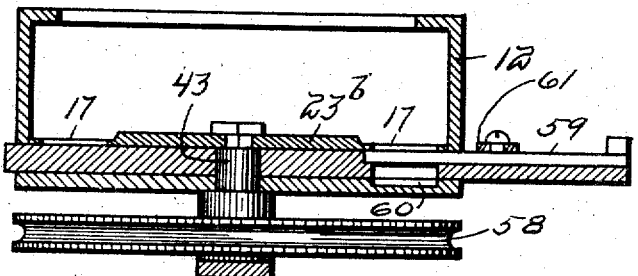
Fig. 14.
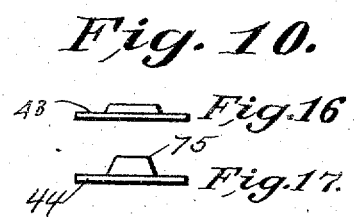
Fig. 16.
Fig. 17.
Fig. 18.

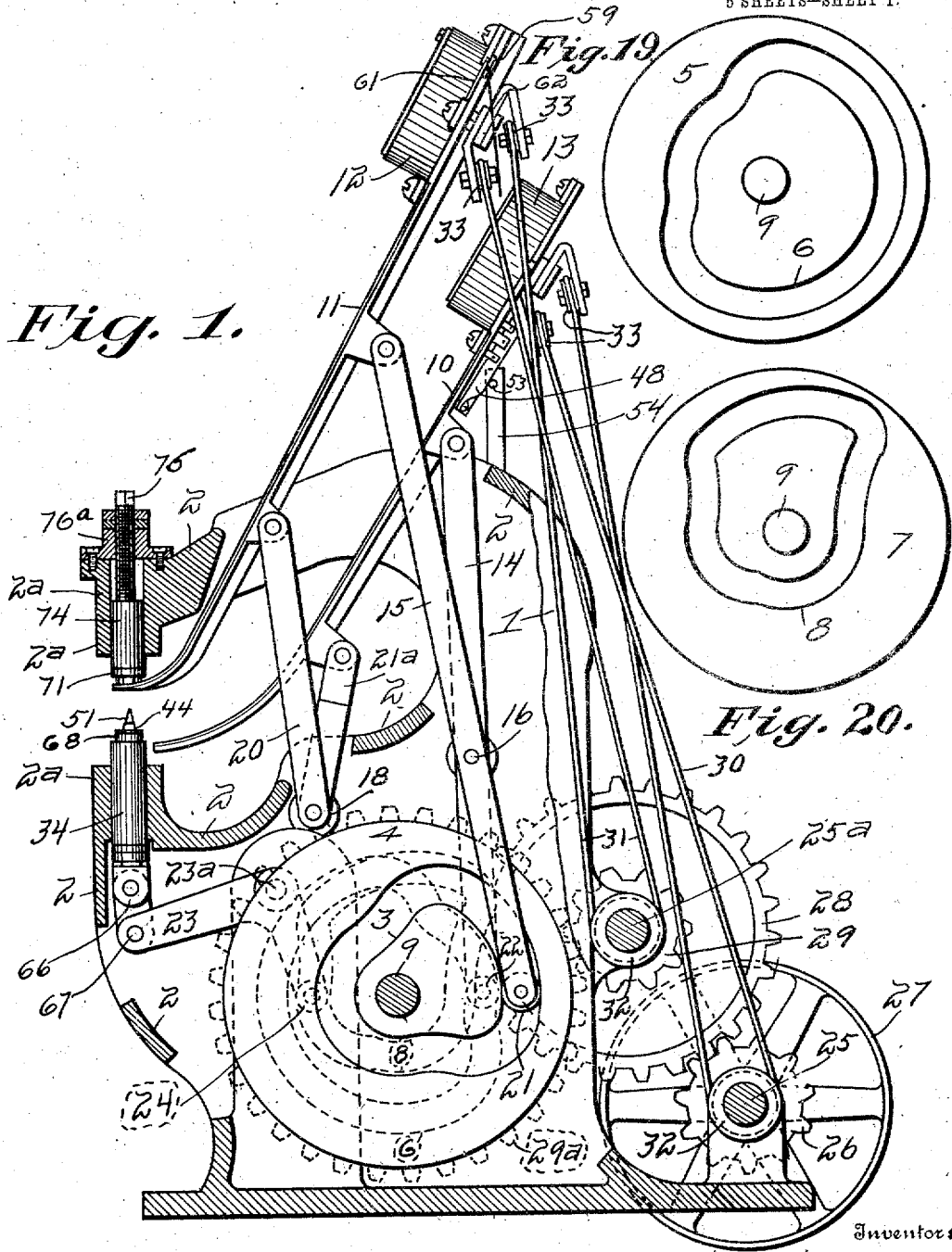

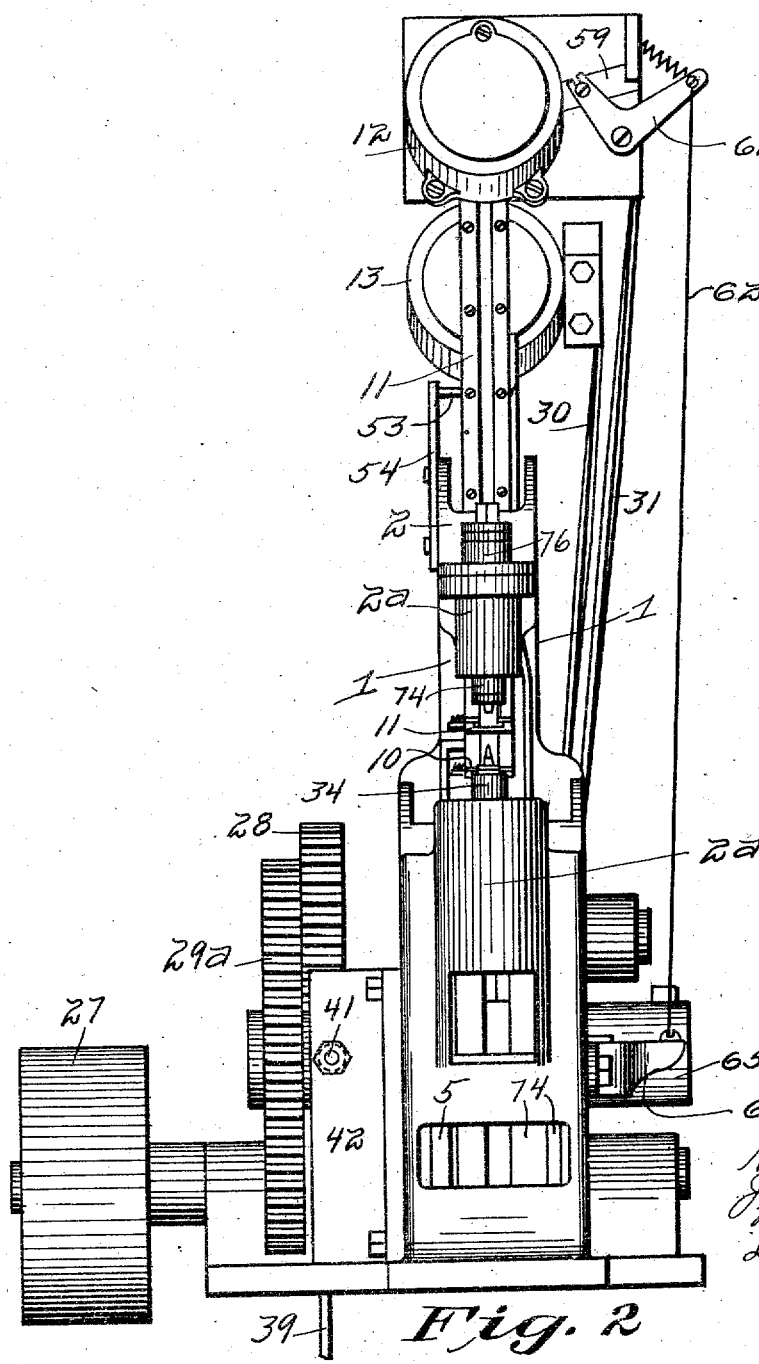

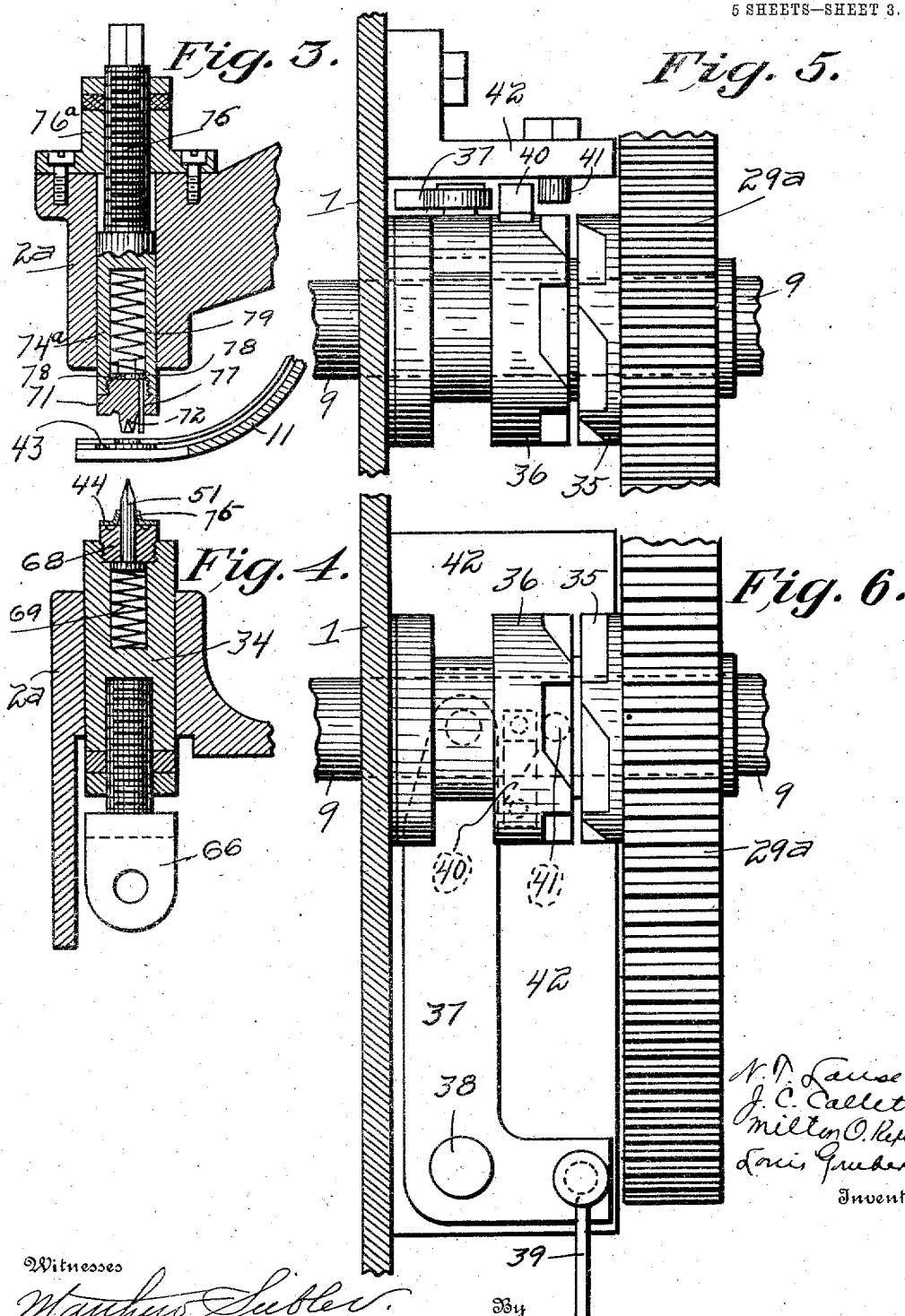

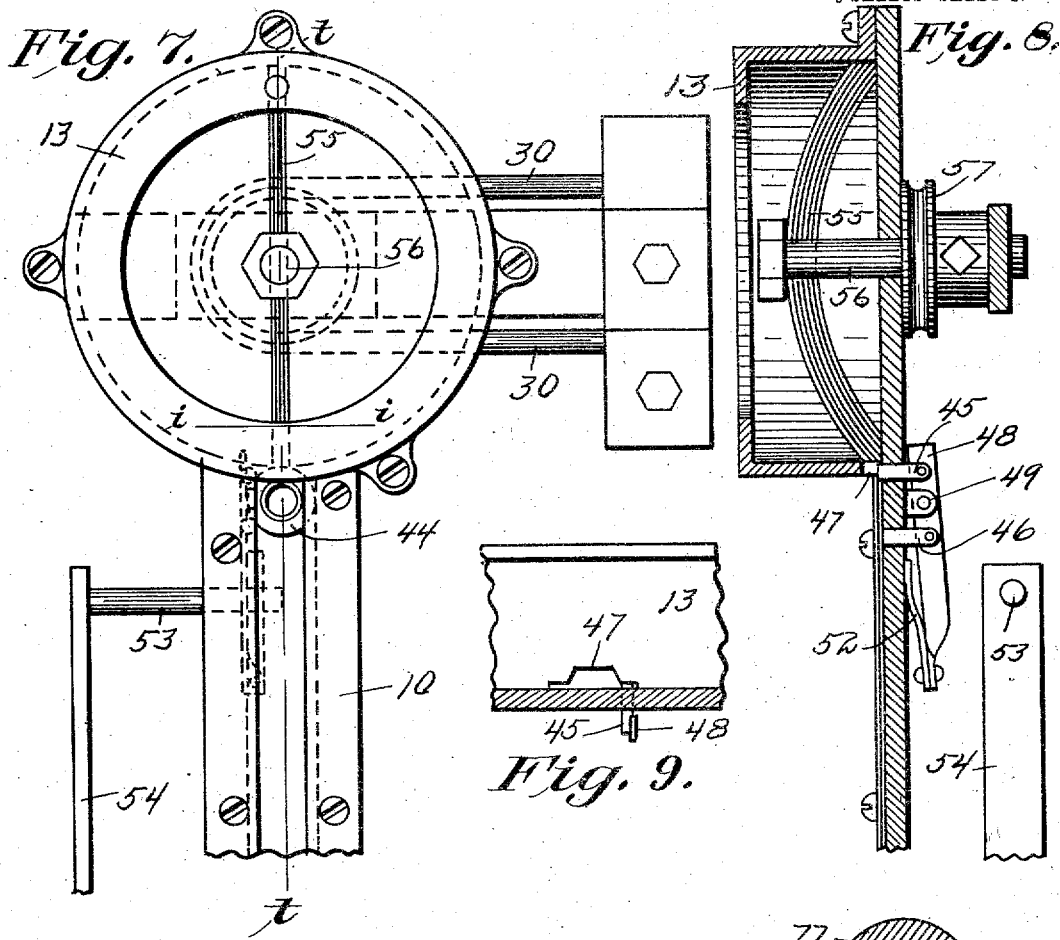
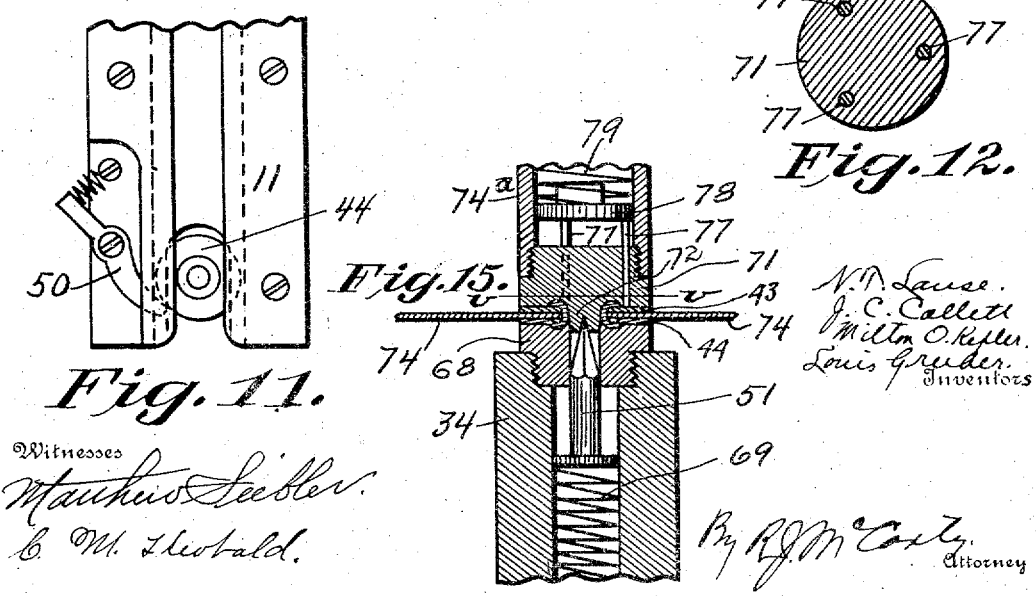

UNITED STATES PATENT OFFICE.

NICHOLAS T. LAUSE, JOHN C. COLLETT, MILTON O. KEPLER, AND LOUIS GRUBER, OF DAYTON, OHIO, ASSIGNORS TO SCHOPPS SPECIAL BAG CO., OF DAYTON, OHIO, A FIRM.

EYELETING-MACHINE.

No. 867,516.   Specification of Letters Patent.   Patented Oct. 1, 1907.

Application filed November 26, 1906. Serial No. 345,000

*To all whom it may concern:*

Be it known that we, NICHOLAS T. LAUSE, JOHN C. COLLETT, MILTON O. KEPLER, and LOUIS GRUBER, citizens of the United States, residing at Dayton, in the county of Montgomery and State of Ohio, have invented certain new and useful Improvements in Eyeleting-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for attaching gromets to fabrics or other material such as canvas, leather, etc.

The object of the invention is to provide a machine which, in one operation, will perforate the fabric or material and unite the male and female gromets to complete the eyelet.

The invention consists broadly in the means for performing the above unitary operation, and to means for automatically feeding the female gromets into proper position to be taken up and acted upon in the operations of clenching the gromets to the fabric.

Preceding a detail description of the invention, reference is made to the accompanying drawings, of which—

Figure 1, is a side elevation of the machine with one side of the frame removed. Fig. 2, is a front elevation of the machine. Fig. 3, is an enlarged sectional view of the portion of the frame-work in which the upper clenching mechanism is supported. Fig. 4, is a similar view of the portion of the frame supporting the lower clenching mechanism. Figs. 5 and 6, are top plan views and a front elevation of a portion of the gearing and clutch mechanism by means of which the power is controlled to obtain a complete revolution of the respective cams. Fig. 7, is an enlarged top plan view of the hopper which contains the male gromets, a portion of the chute being also shown. Fig. 8, is a sectional view of the same on the line *t—t* of Fig. 7. Fig. 9, is a sectional view on the line *i—i* of Fig. 7. Fig. 10, is a detail view of the trip device for feeding the female gromets. Fig. 11, is a detail view of the lower end of either of the gromets chutes extending from the hoppers of either the male or female gromets. Fig. 12, is a detail sectional view on the line *v—v* of Fig. 15. Fig. 13, is an enlarged plan view of the hopper for the female gromets, a portion of the chute extending therefrom. Fig. 14, is a sectional view on the line *n—n* of Fig. 13. Fig. 15, is an enlarged sectional view of the clenching mechanism showing the completed operation of uniting the gromets to the fabric. Fig. 16, is a detail view of the female gromet. Fig. 17, is a detail view of the male gromet. Fig. 18, is a view of a portion of a fabric showing the gromets united thereto. Fig. 19, is a detail view of the cam for actuating the lower or male gromet mechanism. Fig. 20, is a detail view of the cam for actuating the upper or female gromet mechanism.

In a detail description of the invention, similar reference characters indicate corresponding parts.

The frame-work of the machine may be of any suitable design to provide the necessary space. As shown in the drawings it consists of two upright parts 1 which are joined by integral cross-pieces 2 and in the forward portion of which two heads $2^a$ are located for the gromet-clenching devices to be hereinafter described. The operations of the machine depend in the main upon three master cams which are cut in disks 4—5 and 7 arranged upon a common shaft 9 having suitable bearings in the frame; these internal cams are designated 3—6 and 8 and from them the necessary movements are imparted to the gromet hoppers 12 and 13 and their respective chutes 10 and 11 to be hereinafter described. Power is transmitted to the cam shaft 9 from the main power shaft 25 which carries a belt pulley 27 and also a pinion 26, the latter pinion meshes with a larger spur wheel 28 of suitable diameter upon shaft $25^a$; from the latter shaft power is transmitted to the cam shaft 9 from a pinion 29 on said shaft $25^a$ which meshes with a large spur wheel $29^a$ on the cam shaft. On a face of the spur wheel $29^a$ there is a clutch member 35 which is adapted to engage with a clutch member 36 which is slidably mounted on the cam shaft 9 and is operated through a shifting lever 37 pivoted at 38 and having a downwardly extended connection 39 which is operated by means of a foot treadle (not shown) to throw said clutch into engagement; at a complete revolution of the cam shaft the clutch members 35 and 36 are thrown out of engagement as in Figs. 5 and 6 by means of a tapered lug 40 which is on the periphery of the clutch member 36 in a position for its tapering surface to be engaged by a pin 41 which is stationary on the rear wall 42.

The chutes 10 and 11 are given the necessary reciprocating movements from the internal cams 3 and 6 which act upon connecting rods 14 and 15 which are pivotally connected to said chutes 10 and 11 and are fulcrumed upon a boss 16 extending from the frame. The lower ends of these connecting rods or bars 14 and 15 carry rollers 21 and 22 which lie within the internal cams 3 and 6. The forward ends of said chutes are supported by means of pivotal links 20 and $21^a$ which are pivoted to a boss 18 projecting from the frame. The lower ends of these chutes are suitably curved to extend between the gromet-clenching devices at suitable times in their reciprocating movements.

In Fig. 3, the lower end of the chute for the female gromets is shown in the proper position to be relieved of the female gromet 43 which is supported in the slotted end thereof; this slotted end is best shown in Fig. 11, and is similar in both chutes. The hopper 13 for the male gromets is shown in detail on Sheet 4 and is of suitable capacity; the chute 10 extending from this hopper contains a male gromet 44 just in the act of entering said chute and into which said gromets are permitted to pass one at a time through the opening 47 which is shaped to permit of but the single male gromet entering the chute at a time. In the rear of the chute there is a lever 48 fulcrumed at 49 and having two pins 45 and 46, the former of which is adapted to obstruct the entrance 47 from the hopper to the chute, and the latter pin, to-wit—46, catches each gromet after it has passed from the hopper to the chute and releases it to permit of its passage down the chute to the position shown in Fig. 11, where it is arrested by a detent 50; from this position the male gromet 44 is passed out to the end of the chute and the punch 51, to be again referred to.

The lever 48 is normally pressed out to the position in Fig. 8, by a spring 52, and said lever is operated against the tension of said spring and during the operations or movements of the chute by coming in contact with a pin 53 which lies transversely of said lever and is supported upon an upright 54 fixed to the frame-work of the machine. The male gromets within the hopper 13 are agitated by a brush 55 which is fixed to a shaft 56 rotated through means of a pulley 57 which is connected to a pulley 32 on the main driving shaft 25, by a belt or chain 30 which passes over upper pulleys 33 supported at the rear of the hopper 13 and thence around the pulley 57. The hopper 12 for the female gromets is at the upper end of the chute 11 and contains a rotating plate 23$^b$ which has a suitable number of openings 17 therein which are adapted to contain but a single female gromet at a time. The space beneath these openings 17 is such that the female gromets cannot find lodgement therein unless the said gromets are in a position with the concaved sides thereof down; this limited space is shown in Fig. 14 and it is important that said female gromets be so compelled to enter the chute 11 in order that they may be presented in a proper position for the clenching devices to act thereon in uniting the two gromets to the fabric.

The hopper may contain any desirable number of gromets which are picked up by the openings 17 when said gromets are in proper positions as hereinbefore described and the plate 23$^b$ is rotated by being fixed to a shaft 43 having a pulley 58 thereon; this pulley is connected to a pulley 32 on the intermediate driving shaft 25$^a$ through suitable belts or chains 31 which pass over upper pulleys 33 at the rear of the chute 12 and is thence carried around the pulley 58. The female gromets so picked up in the openings 17 of the plate 23 are released by a slide 59 which projects into the hopper 12 below the revolving plate 23$^b$, and when this slide 59 is withdrawn from the hopper, the gromet lying in the opening 17 above said slide 59 is permitted to drop into the passage-way 60 through which it falls by gravity into the chute 11. The slide 59 is tripped to thus release the gromets by means of a suitable lever 61 which has one end connected with the slide and the other end connected with a trip connection 62 which extends down and connects with a pivotal arm 63 which is tripped by a projection 64 on a collar 65 on the cam shaft 9. Each revolution of the cam shaft trips the slide 59 a sufficient length of time to permit one gromet to drop into the passage 60, owing to a proper ratio of the gearing; the same complete revolution of the cam shaft completes the operation of uniting the gromets to the fabric, and the mechanism of which will now be described. Movably mounted in the lower head or socket 2$^a$ is a plunger 34 which is connected to a bell crank lever 23 pivoted at 23$^a$ and carrying on its lower arm a roll 24 which lies in the internal cam 8 of the disk 7—see Figs. 1 and 15. The connection between the bell crank lever 23 and the plunger 34 is by means of an apertured head 66 and a pin 67.

Supported in the upper end of the plunger 34 is a punch 51 before referred to, which passes through an apertured anvil 68 which screws into the upper end of said plunger 34. Within the plunger and below the head of the punch 51 is a spring 69 which exerts normal pressure upwardly on said punch. The upper surface of the anvil 68 supports the male gromet 44 when delivered thereto by the chute 11 with the point of the punch 51 projecting through the opening in said gromet. The surface of the anvil 68 below the gromet is provided with an annular recess into which the gromet is pressed when pressure is exerted thereagainst in bringing the parts together—see Figs. 4 and 15. The upper or stationary member of the clenching devices consists of a clenching block 71 which has a lower projecting portion 72 with a recess therein designed to receive the point of the punch 51 when the parts are brought together in the completed operation of uniting the gromets to the fabric as shown in Fig. 15. In elevating the punch 51, the fabric 74 is perforated thereby to form the opening around which the male and female gromets are united, said fabric after being so punctured is pressed down upon the upper surface of the male gromet lying upon the anvil 68 and the extension 75 of the male gromet is clenched over against the upper side of the female gromet and thus unites the two gromets with the fabric between them—see Fig. 18. When the punch 51 enters the female gromet which is supported on the end of the chute 11 as shown in Fig. 3, the said chute moves rearwardly out of the way and the punch 51 travels upwardly to engage the projection of the clenching block 71. When the parts thus engage, the punch 51 is pressed downwardly against the spring 69 as shown in Fig. 15. The clenching block 71 is screwed into the cylindrical portion 74$^a$, the upper end of which extends in the form of a screw 76 which is screwed through a cap 76$^a$ which is fastened on the top of the upper socket 2$^a$; it will thus be seen that the position of the clenching block 71 may be adjusted by turning the screw 76 to the desired extent to raise or lower said block.

In the operation of clenching the male and female gromets together, it is necessary that the female gromet be held level upon the upper surface of the fabric; this is accomplished by means of a plurality of pins 77 which extend downwardly from a plate 78 and pass through openings in the clenching block 71 to make contact with the upper surface of the female gromet 43—see Fig. 15. The plate 78 has a coil spring 79 above it which normally holds the pins 77 in contact with the gromet and as said gromet is moved upwardly, the pins 77 likewise move upwardly against the tension of said spring 79.

Briefly described, the operation is as follows: A male gromet is removed from the end of the chute 10 while said end is in proximity to the punch 51, said punch being elevated to enter the gromet; the chute 10 is timed to move rearwardly and to thus have the gromet upon the punch as shown in Figs 1 and 4, or the said male gromet may be removed from the chute by hand and placed in such position upon the punch. The fabric is then placed by the hands above the punch and the continued upward movement of said punch perforates said fabric to form the hole therein; in the meantime, the female gromet is supported in position on the chute 11 above the punch 51, and the said punch penetrates said gromet at which time the chute 11 recedes out of the way; the leveling pins 77 next engage the gromet 43 and maintain said gromet in position around the punch 51 until the parts are pressed together to the limit as shown in Fig. 15. In this view, it will be seen that the shank 75 of the male gromet extends through the opening in the female gromet and is clenched over against the surrounding edge of said female gromet. All this, to-wit—the making of the opening in the fabric and the uniting of the two gromets being done in one operation and during one revolution of the crank shaft 9.

We claim:

1. In a machine of the type specified, a movable punch, means for supporting a male gromet in a position surrounding said punch, means for delivering a female gromet to the punch above the fabric, and a series of vertical pins yieldingly mounted and engaging the upper surface of the female gromet to maintain said gromet in a level position on the upper surface of the fabric during the operation of uniting the gromets to the fabric.

2. In a machine of the type specified, a punch, means for delivering male gromets to said punch, means for elevating said punch to first receive a male gromet and then to perforate the fabric, and finally to receive a female gromet, means for delivering female gromets to said punch, means for clenching said male and female gromets after being so received by said punch, a series of vertically movable pins adapted to engage the upper side of the female gromet to maintain the same in a level position while being united to the male gromet and a spring exerting a normal downward pressure upon said pins.

3. In a machine of the type specified, a clenching block, a punch adapted to receive a male gromet and to perforate a fabric means for operating said punch, means for delivering to said punch a male gromet before perforating the fabric, means for delivering to said punch a female gromet after perforating the fabric, and means mounted above the clenching block and adapted to engage the upper side of the female gromet and to maintain said gromet in a level position on the fabric during the operations of uniting said male and female gromets.

4. In a machine of the type specified, a plunger, a punch yieldingly supported therein, means for delivering a male gromet to said punch, means for delivering a female gromet to the punch automatically with the concaved surface thereof lying downwardly, means for clenching the gromets to unite them to the fabric, and vertically-yielding means engaging the upper side of the female gromet when the punch is being elevated and by means of which the female gromet is held in a level position while being clenched or united with the male gromet.

5. In a machine of the type specified, a plunger, a punch yieldingly supported in said plunger, means for operating said plunger and punch, means for holding a male gromet in position with the punch extending therethrough, automatic means for delivering said male gromet to said support, means for automatically delivering the female gromet into a position with the concaved side thereof down and with the axis thereof in alinement with the punch and after said punch has penetrated the fabric to which the gromets are to be united, an upper clenching device against which the female gromet is pressed and into which the punch extends in completing the operation of clenching the gromets, and a series of spring-pressed pins adapted to engage the female gromet to maintain the same in a level position against the fabric while the plunger is advancing to engage the upper clenching device.

6. In a machine of the type specified, a plunger, a punch yieldingly supported therein, means for operating said plunger, a support for the male gromets and through which said punch penetrates, a hopper and a feed chute extending therefrom with means for feeding the female gromets from said hopper to the chute with their concaved surfaces downward, means for clenching the male gromet and the female gromet after the punch has penetrated the fabric and both gromets, and a series of spring-pressed pins adapted to engage the upper side of the female gromet to maintain the same in a level position on the fabric while the gromets are being united.

7. In a machine of the type specified, a movable punch adapted to perforate a fabric means for operating said punch, means for supporting a male gromet below said fabric and surrounding said punch, means for supporting a female gromet in a position to receive the punch as the latter moves upwardly, an upper clenching member against which the female gromet is pressed when the punch is elevated, and a yielding device mounted above said upper clenching member and extending therethrough and adapted to hold the female gromet in a level position against the upper surface of the fabric during the clenching operation.

8. In a machine of the type specified, a movable punch, means for delivering the male gromets to said punch, means for supporting the male gromets with the punch extending therethrough, and means for delivering the female gromets to said punch with the concaved side of said gromets down, said means comprising a disk rotatable on the bottom of the hopper and provided with a plurality of openings adapted only to receive the female gromets with the concaved sides downward, and a reciprocating slide below said disk and adapted to permit the gromets to pass from said openings below said disk.

9. In a machine of the type specified, a plunger, an anvil supported on said plunger, a punch yieldingly supported on said plunger, means for delivering a male gromet to said punch, a clenching block above said punch, means for delivering a female gromet below said clenching block and above the punch, and means extending through said clenching block to hold the female gromet in a level position against the fabric.

10. In a machine of the type specified, an anvil, a plunger supporting said anvil, a punch projecting from the axis of said anvil, means for delivering a male gromet to said punch, means for operating the plunger to elevate the anvil and the punch with the male gromet in position thereon and to perforate a fabric, means for delivering a female gromet to the punch above the fabric, a clenching block coöperating with the anvil to unite the gromets, and pins loosely penetrating the clenching block and adapted to engage the upper side of the female gromet to hold said gromet in a level position against the fabric during the operation of uniting the gromets.

11. In a machine of the type specified, an anvil and a punch adapted to respectively support a gromet and perforate a fabric during the simultaneous movement of said anvil and punch, means for imparting such movement to said anvil and punch, a gromet hopper, a chute extending therefrom and adapted to deliver a second gromet to the punch above the fabric, means within the hopper to compel the last-named gromet to feed with the concaved side thereof down, a clenching block coöperating with the anvil to unite the two gromets to the fabric, and a series of yielding pins penetrating said clenching block and adapted to hold the female gromet in a level position against the upper surface of the fabric until said clenching block and anvil complete the operation of uniting the gromets.

12. In a machine of the type specified, an anvil and a punch adapted to respectively support a gromet and perforate a fabric during the simultaneous movement of said anvil and punch, means for imparting such movement thereto, a clenching block coöperating with the anvil, a series of yielding pins adapted to engage the female gromet to hold it in a level position while the anvil and the punch are advancing to the clenching block, and adjustable means for varying the position of the clenching block.

In testimony whereof we affix our signatures, in presence of two witnesses.

NICHOLAS T. LAUSE.
JOHN C. COLLETT.
MILTON O. KEPLER.
LOUIS GRUBER.

Witnesses:
R. J. McCARTY,
C. M. THEOBALD.